United States Patent
Tanigawa et al.

(10) Patent No.: US 9,473,654 B2
(45) Date of Patent: Oct. 18, 2016

(54) IMAGE FORMING APPARATUS AND IMAGE POSITION DETECTING ORIGINAL

(71) Applicant: FUJI XEROX CO., LTD., Tokyo (JP)

(72) Inventors: Tomohiro Tanigawa, Kanagawa (JP); Kosuke Kubota, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/681,706

(22) Filed: Apr. 8, 2015

(65) Prior Publication Data

US 2016/0021269 A1    Jan. 21, 2016

(30) Foreign Application Priority Data

Jul. 18, 2014   (JP) .................................. 2014-147683

(51) Int. Cl.
*H04N 1/04* (2006.01)
*H04N 1/00* (2006.01)

(52) U.S. Cl.
CPC ................................. *H04N 1/00702* (2013.01)

(58) Field of Classification Search
CPC ................................................ H04N 1/00702
USPC ....................................... 358/1.14, 1.15, 474
See application file for complete search history.

(56) References Cited

U.S. PATENT DOCUMENTS

| 5,239,388 A | * | 8/1993 | Matsumoto | G06T 3/602 358/296 |
| 2002/0106209 A1 | * | 8/2002 | Niimura | B41J 11/009 399/45 |
| 2005/0226534 A1 | * | 10/2005 | Moroo | G06T 7/0042 382/291 |
| 2007/0177220 A1 | | 8/2007 | Hatano | |

FOREIGN PATENT DOCUMENTS

| JP | 11-69138 A | 3/1999 |
| JP | 2007-194938 A | 8/2007 |

\* cited by examiner

*Primary Examiner* — Houshang Safaipour
(74) *Attorney, Agent, or Firm* — Sughrue Mion, PLLC

(57) ABSTRACT

An image forming apparatus includes an image forming unit; a sending unit that sends an original formed by the image forming unit; a reading unit that reads an image of the original that is sent by the sending unit; a detecting unit that, from the image read by the reading unit, detects an end portion detecting image formed at a predetermined position of the original; and a determining unit that determines a search region for searching for an end portion of the original included in the image by recognizing the position of the end portion detecting image detected by the detecting unit.

22 Claims, 12 Drawing Sheets

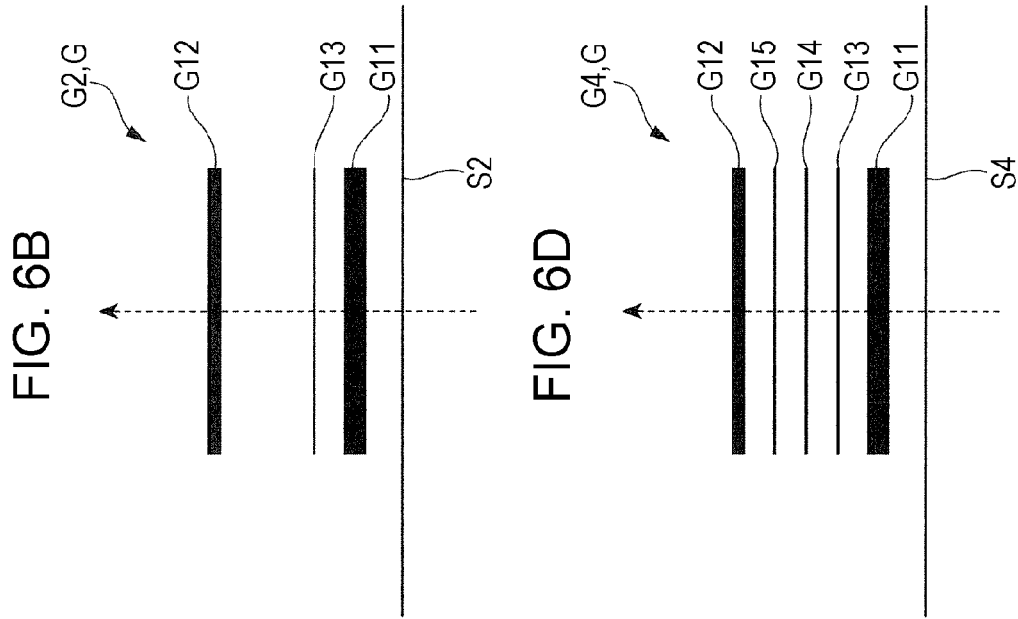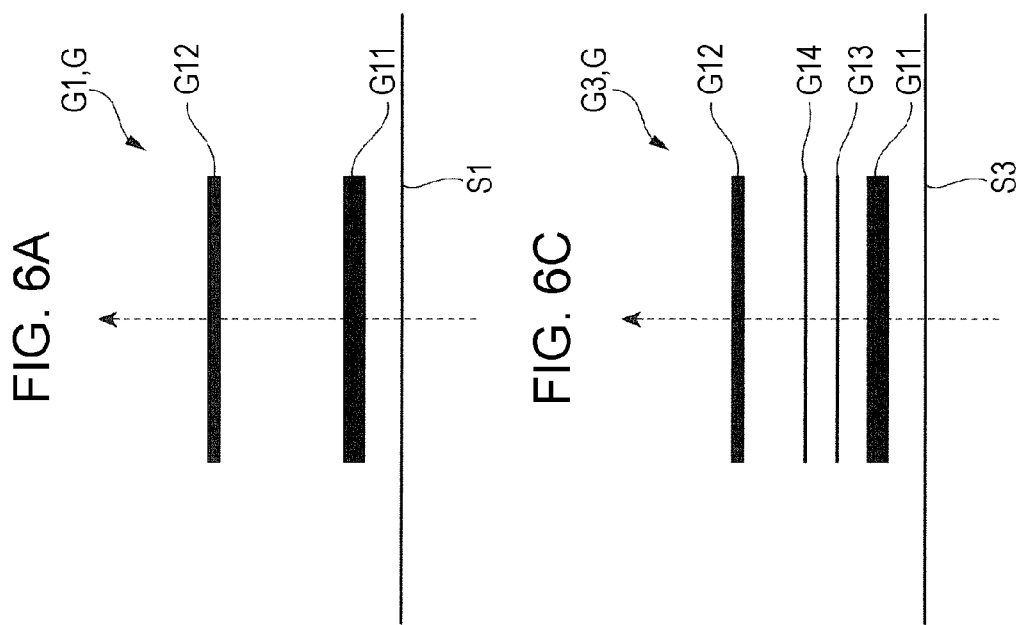

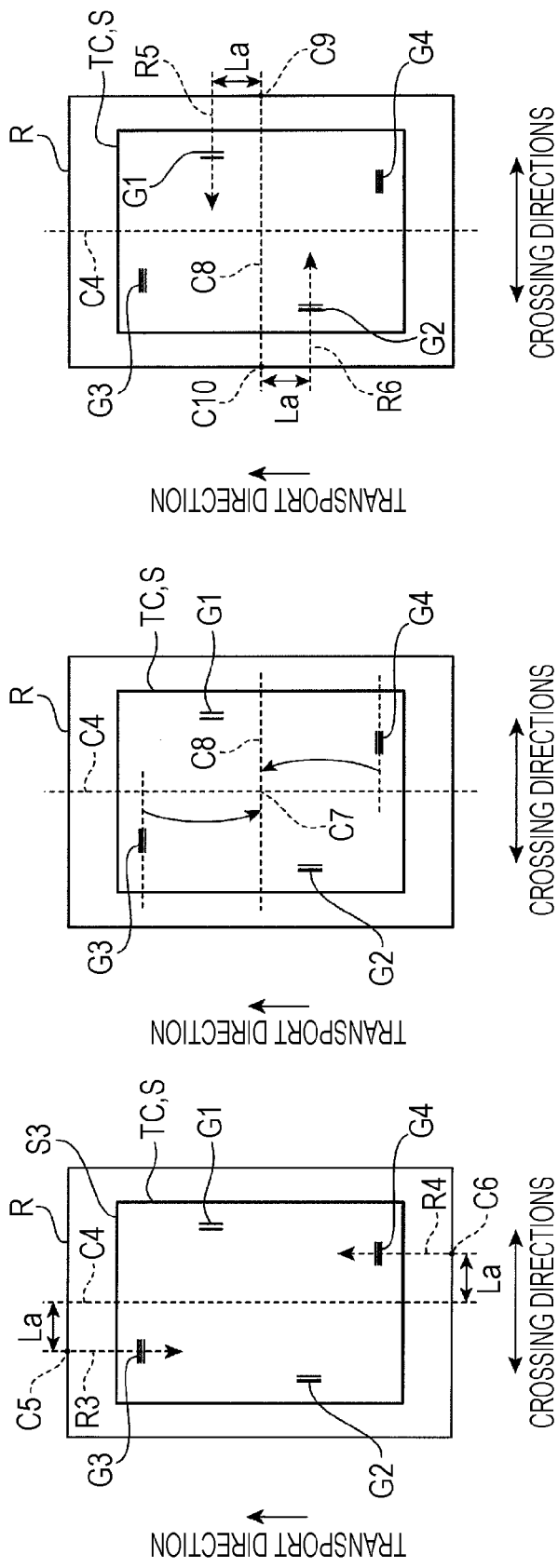

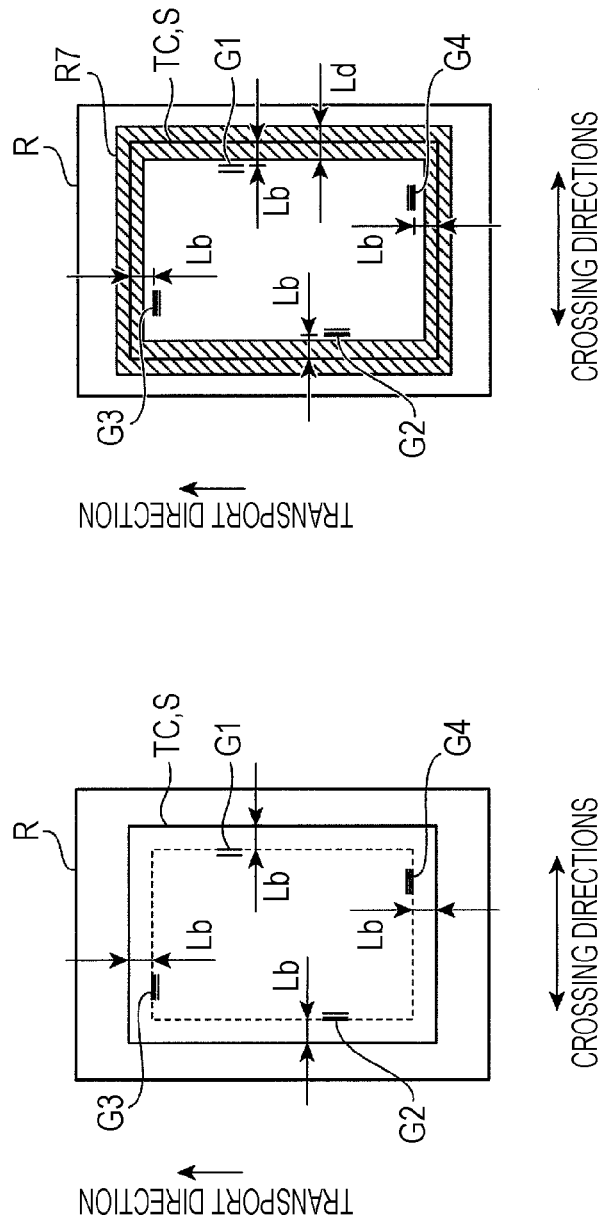

IMAGE FORMING APPARATUS AND IMAGE POSITION DETECTING ORIGINAL

CROSS-REFERENCE TO RELATED APPLICATIONS

This application is based on and claims priority under 35 USC 119 from Japanese Patent Application No. 2014-147683 filed Jul. 18, 2014.

BACKGROUND

Technical Field

The present invention relates to an image forming apparatus and an image position detecting original.

SUMMARY

According to an aspect of the invention, there is provided an image forming apparatus including an image forming unit; a sending unit that sends an original formed by the image forming unit; a reading unit that reads an image of the original that is sent by the sending unit; a detecting unit that, from the image read by the reading unit, detects an end portion detecting image formed at a predetermined position of the original; and a determining unit that determines a search region for searching for an end portion of the original included in the image by recognizing the position of the end portion detecting image detected by the detecting unit.

BRIEF DESCRIPTION OF THE DRAWINGS

An exemplary embodiment of the present invention will be described in detail based on the following figures, wherein:

FIGS. 6A to 6D each illustrate an edge detecting mark to which the exemplary embodiment is applied;

FIGS. 8A to 8C each illustrate an operation for detecting end portions of the test chart to which the exemplary embodiment is applied;

FIGS. 8D and 8E each illustrate an operation for detecting the end portions of the test chart to which the exemplary embodiment is applied;

DETAILED DESCRIPTION

An exemplary embodiment of the present invention is hereunder described in detail with reference to the attached drawings.

Image Forming Apparatus 1

Figure 1:
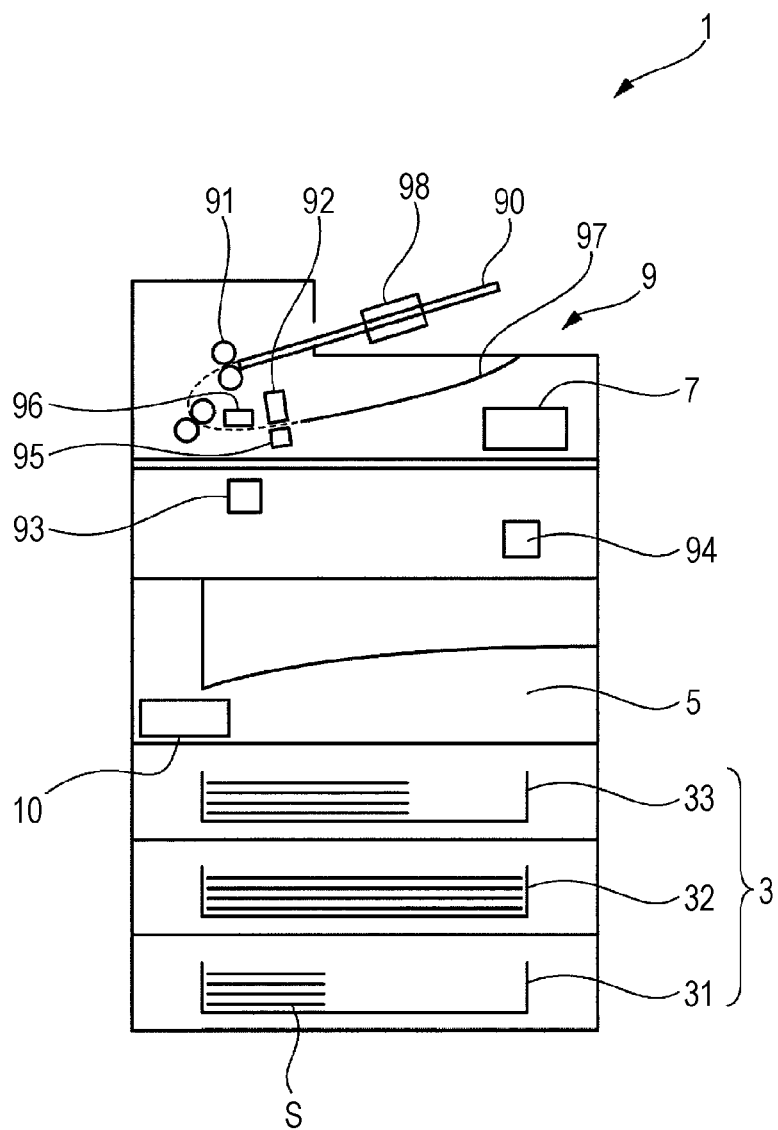
FIG. 1 illustrates an exemplary structure of an image forming apparatus to which an exemplary embodiment is applied.

FIG. 1 illustrates an exemplary structure of an image forming apparatus 1 to which the exemplary embodiment is applied.

As shown in FIG. 1, the image forming apparatus 1 is a multi-function apparatus having, for example, a copying function, a printing function, and a scanner function. The illustrated exemplary image forming apparatus 1 includes a sheet supplying unit 3, an image forming unit 5, a user interface (UI) 7, an image reading unit 9, and a general controller 10.

The sheet supplying unit 3 holds sheets S on which images are to be formed by the image forming unit 5 and transports the sheets S towards the image forming unit 5 one sheet at a time. In the illustrated example, the sheet supplying unit 3 includes a first tray (holding unit) 31, a second tray 32, and a third tray 33, each of which holds sheets S. When described further, the first tray 31, the second tray 32, and the third tray 33 may hold sheets S of, for example, different sizes, thicknesses, or types.

The image forming unit 5 acquires image data. On the basis of the acquired image data, the image forming unit 5 forms an image on a recording medium, such as a sheet S, using an image forming material, such as toner or ink. In the exemplary embodiment, the image forming system is not particularly limited to certain systems. Various systems, such as an electrophotographic system, an inkjet system, or an electrostatic induction system, may be used. The image data may be received from an external device via a communication unit (such as a network interface) that is not shown, or may be provided by an image read by the image reading unit 9. In order to form images on two surfaces (that is, a first surface and a second surface) of a sheet S, the image forming unit 5 has a reverse transport path (not shown) for forming its corresponding image on the second surface of the sheet S that is transported while the sheet S on whose first surface its corresponding image has been formed is being reversed.

The UI 7 includes a display panel. The UI 7 receives an instruction from a user and displays, for example, a message for the user.

Image Reading Unit 9

The image reading unit 9 reads images formed on sheets S while the sheets S (originals) on which the images have been formed are successively sent.

In the illustrated example, the image reading unit 9 includes a first original tray (placing unit) 90, a sheet transporting unit (sending unit) 91, a first image sensor 92, a mirror 93, and a second image sensor 94. Sheets S are placed on the first original tray 90. The sheet transporting unit 91 includes transport rollers that send out the sheets S placed on the first original tray 90 one sheet at a time. The first image sensor 92 reads an image formed on the first surface of a sheet S while receiving light from the first surface of the sheet S that is transported by the sheet transporting unit 91. The mirror 93 guides light from a second surface, which is a surface situated opposite to the first surface of the sheet S that is transported by the sheet transporting unit 91. The second image sensor 94 receives the light from the second surface guided by the mirror 93 and reads the image formed on the second surface.

The image reading unit 9 also includes a first supporting member 95, a second supporting member 96, and a second original tray 97. The first supporting member 95 is provided in a reading region, where the first image sensor 92 reads an image, and supports a sheet S that is transported. The second supporting member 96 is provided in a reading region where the second image sensor 94 reads an image and supports a sheet S that is transported. The sheet S whose images have been read is placed on the second original tray 97. The image reading unit 9 further includes a sheet guide 98 (described later) that is provided at the first original tray 90 and that regulates the position of the sheet S that is transported.

The use of a line sensor as the first image sensor 92, which is an exemplary reading unit, and the use of a charge coupled device (CCD) sensor as the second image sensor 94 are exemplified. In the illustrated example, when the first image sensor 92 reads an image on the first surface of a sheet S, the second image sensor 94 reads an image on the second surface of the sheet S. By this, when the sheet transporting unit 91 transports the sheet S in a first direction once, the images on the two surfaces (that is, the first surface and the second surface) of the sheet S are read.

Sheet Guide 98

Figure 2:
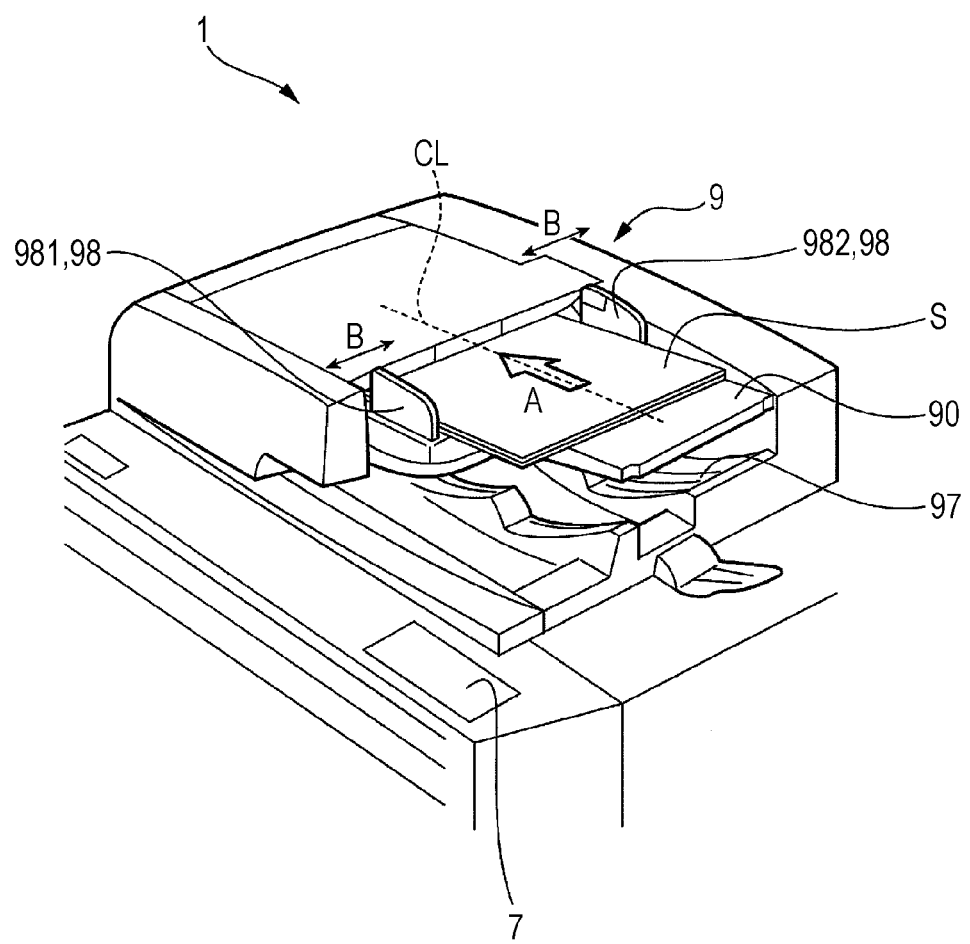
FIG. 2 illustrates an exemplary structure of a sheet guide to which the exemplary embodiment is applied.

FIG. 2 illustrates an exemplary structure of the sheet guide 98 to which the exemplary embodiment is applied.

Next, the structure of the sheet guide 98 is described with reference to FIG. 2.

As shown in FIG. 2, the sheet guide 98 includes a pair of plate members 981 and 982 that are provided, one on each side of a sheet S on the first original tray 90 in a direction that crosses a transport direction of the sheet S. The direction that crosses the transport direction may hereunder be referred to as "crossing direction". The transport direction of the sheets S corresponds to a sending direction (refer to arrow A in FIG. 2) and may hereunder be simply referred to as "transport direction". The surfaces of the plate members 981 and 982 are provided along the transport direction and align end portions of the sheets S along the transport direction. The plate members 981 and 982 are movable in the crossing direction while the states of the surfaces of the plate members 981 and 982 along the transport direction are maintained (refer to the double-headed arrows B).

The plate members 981 and 982 are disposed such that a sheet S is centered, that is, subjected to center registration, and transported.

More specifically, the plate members 981 and 982 are disposed on respective sides of a centerline CL and at equal distances from the centerline CL in a direction that crosses a region where a sheet S that is transported passes. When, as described above, the plate members 981 and 982 move in the crossing directions (refer to the double-headed arrows B in FIG. 2), the plate members 981 and 982 move while they are equal distances apart from the centerline CL. This causes a sheet S that is placed on the first original tray 90 and that is interposed between the plate members 981 and 982 to be transported with the center of this sheet S in the crossing directions being a reference position. When described further, even if the sizes of sheets S differ, the positions where the centers of the sheets S in the crossing directions pass correspond to each other.

General Controller 10

Figure 3:
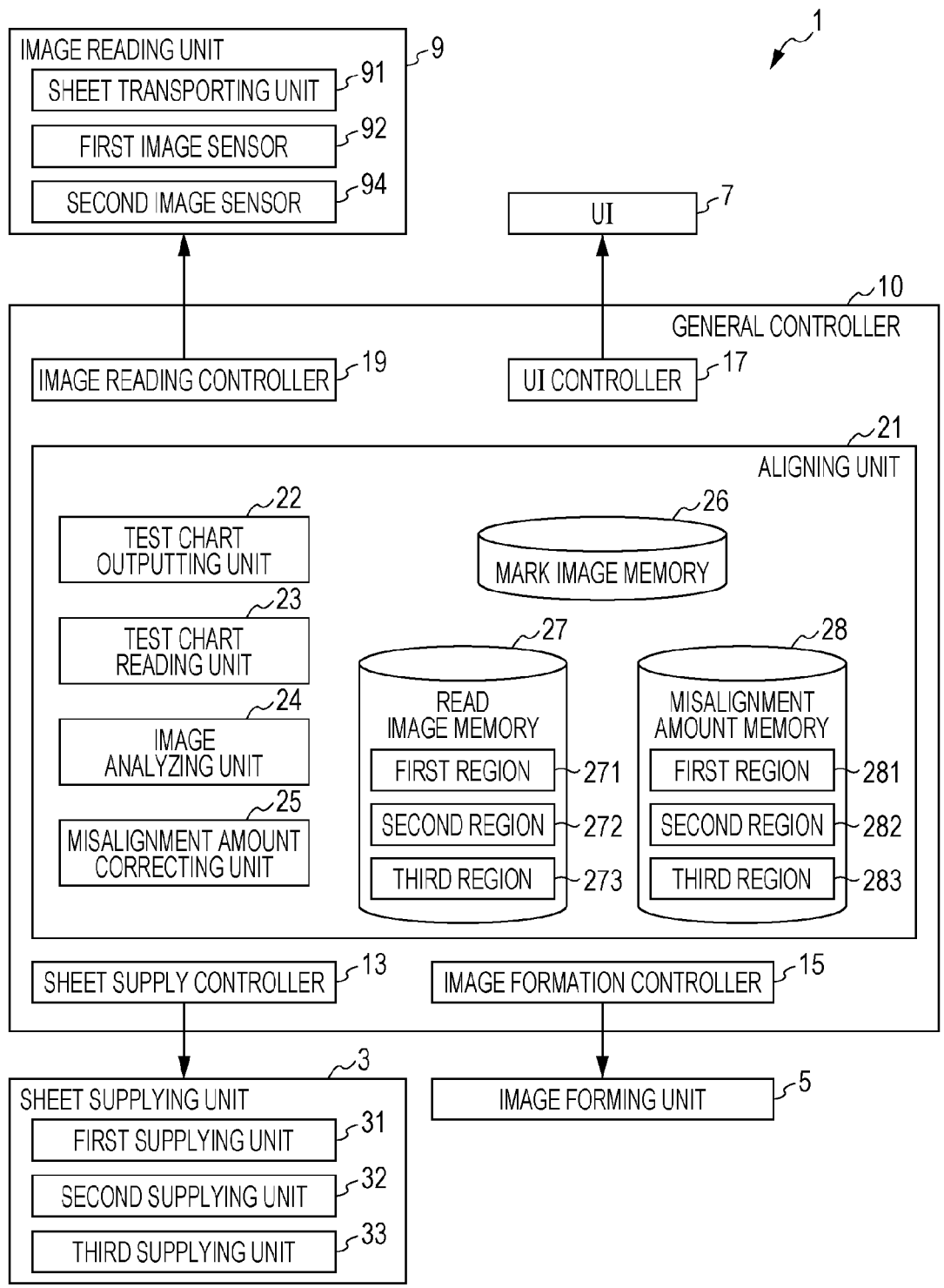
FIG. 3 illustrates an exemplary functional configuration of a general controller to which the exemplary embodiment is applied.

FIG. 3 illustrates an exemplary functional configuration of the general controller 10 to which the exemplary embodiment is applied.

Next, the general controller 10 of the image forming apparatus 1 is described with reference to FIG. 3.

The general controller 10 controls functional configuration members (such as the sheet supplying unit 3, the image forming unit 5, the UI 7, and the image reading unit 9) of the image forming apparatus 1. The general controller 10 includes, as functional units, a sheet supply controller 13, an image formation controller 15, a UI controller 17, an image reading controller 19, and an aligning unit 21.

The sheet supply controller 13 controls the operation of the sheet supplying unit 3. More specifically, the sheet supply controller 13 controls the sheet supplying unit 3 such that a sheet S is supplied towards the image forming unit 5 from any one of the first tray 31 to the third tray 33 in accordance with a print instruction.

The image formation controller 15 controls the operation of the image forming unit 5. More specifically, the image formation controller 15 controls the image forming unit 5 so as to form an image on a sheet S that is supplied from the sheet supplying unit 3 in accordance with the print instruction.

The UI controller 17 controls the operation of the UI 7. The UI controller 17 controls the UI 7 so as to display the contents of a test chart output instruction screen 700 (refer to FIG. 9A described below) and the contents of a test chart reading instruction screen 750 (refer to FIG. 9B described below) and so as to receive a user instruction based on these screens.

The image reading controller 19 controls the operation of the image reading unit 9. More specifically, the image reading controller 19 controls the image reading unit 9 such that the image reading unit 9 reads an image of a sheet S placed on the image reading unit 9 in accordance with a reading instruction.

When adjusting the positions of images that are formed on sheets S (that is, aligning images that are formed on the sheets S), the aligning unit 21 controls the operation of the sheet supplying unit 3, the operation of the image forming unit 5, the operation of the UI 7, and the operation of the image reading unit 9 by using the sheet supply controller 13, the image formation controller 15, the UI controller 17, and the image reading controller 19.

The aligning unit 21 includes, as functional units, a test chart outputting unit 22, a test chart reading unit 23, an image analyzing unit 24, a misalignment amount correcting unit 25, a mark image memory 26, a read image memory 27, and a misalignment amount memory 28.

The test chart outputting unit 22 causes the UI 7 to display the contents of the test chart output instruction screen 700 and receives an instruction for outputting a test chart TC (that is, a test chart output instruction) from a user via the test chart output instruction screen 700. The test chart TC is described below. The test chart outputting unit 22 causes the sheet supplying unit 3 to supply a sheet S in accordance with the received test chart output instruction and causes the image forming unit 5 to form an image in accordance with information stored in the mark image memory 26.

The test chart reading unit 23 causes the UI 7 to display the contents of the test chart reading instruction screen 750 (described below) and receives an instruction for reading the test chart TC (that is, a test chart reading instruction) from a user via the test chart reading instruction screen 750. The test chart reading unit 23 causes the image reading unit 9 to read images in the test chart TC in accordance with the received test chart reading instruction.

The image analyzing unit 24, which is an exemplary detecting unit and an exemplary determining unit, analyzes the read images in the test chart TC to, on the basis of edge detecting marks G (described below), detect end portions S1 to S4 (described below) of the test chart TC, and to, on the basis of, for example, grid marks H (described below), calculate the misalignment amount of an image that is formed on a sheet S by the image forming unit 5.

The misalignment amount correcting unit 25 corrects the misalignment on the basis of the misalignment amount stored in the misalignment amount memory 28.

The mark image memory 26 stores mark images that are formed in the test chart TC, that is, predetermined images, such as the edge detecting marks G, the grid marks H, two-dimensional bar codes J, auxiliary images K, and auxiliary lines M (described below).

The read image memory 27 stores the images in the test chart TC read by the image reading unit 9. Here, the read image memory 27 stores the images in the test chart TC by associating them with information regarding from which of the first tray 31 to the third tray 33 the test chart TC has been supplied (that is, tray identification information). The read image memory 27 also stores the images in the test chart TC by associating them with information regarding whether or not the images in the test chart TC are images on either the first surface or the second surface of the test chart TC (that is, front and back surface identification information).

In the illustrated example, the read image memory 27 includes a first region 271, a second region 272, and a third region 273. The first region 271 stores images in a test chart TC for the first tray 31. The second region 272 stores images in a test chart TC for the second tray 32. The third region 273 stores images in a test chart TC for the third tray 33. The first region 271 to the third region 273 are capable of storing images for multiple test charts TC.

The misalignment amount memory 28 stores a misalignment amount calculated by the image analyzing unit 24. Here, the misalignment amount memory 28 stores the misalignment amount by associating it with the front and back identification information and the tray identification information about a test chart TC for which the misalignment amount has been calculated.

In the illustrated example, the misalignment amount memory 28 includes a first region 281, a second region 282, and a third region 283. The first region 281 stores the misalignment amount of a test chart TC supplied from the first tray 31. The second region 282 stores the misalignment amount of a test chart TC supplied from the second tray 32. The third region 283 stores the misalignment amount of a test chart TC supplied from the third tray 33. The first region 281 to the third region 283 are each capable of storing the misalignment amounts for multiple test charts TC.

Although not illustrated, the general controller 10 includes a central processing unit (CPU), which is a computing unit, a main memory and a magnetic disk device (hard disk drive (HDD)), which are storing units. Here, the CPU executes various pieces of software, such as an operating system (OS) and an application, and achieves each of the above-described functions. The main memory is a storage region that stores, for example, various pieces of software and data used for executing such pieces of software. The magnetic disk device is a storage region that stores, for example, input data for the various pieces of software and output data from the various pieces of software.

Misalignment

When the image forming apparatus 1 repeatedly performs image forming operations, changes with the passage of time occur. Such changes include, for example, wear of the functional configuration members of the image forming apparatus 1 and displacements of the positions of these members. Therefore, the positions of the images that are formed on sheets S may be misaligned (that is, the positions of the images may vary) with respect to the sheets S.

When described further, if, for example, images are to be formed on both surfaces of sheets S, the image on the first surface and the image on the second surface may not be aligned (front-back register). In addition, since, for example, transport resistance that is generated when the sheets S are transported changes, the positions of the images that are formed on the sheets S may be misaligned (that is, the positions of the images may vary) with respect to the sheets S in accordance with, for example, the size, the type, or the thickness of the sheets S or in accordance with from which of the first tray 31 to the third tray 33 the sheets S have been supplied.

Therefore, in the exemplary embodiment, the displacement of the images on the sheet S, that is, what is called misalignments, are corrected. The process of correcting misalignments is hereunder described.

In the description below, first, the types of misalignments are described. Next, a test chart TC that is used for correcting misalignments is described, after which the instruction screens of the UI 7 for correcting the misalignments are described. Lastly, the process of correcting the misalignments is described in detail.

Types of Misalignment

FIGS. 4A to 4H each illustrate a misalignment type. FIGS. 4A to 4H each illustrate the relationship between a sheet S, an image F that is actually formed on the sheet S, and an ideal position T corresponding to a desired position for forming the image F on the sheet S.

As shown in FIGS. 4A to 4H, the misalignments according to the exemplary embodiment are exemplified as being classified into the following types. That is, the misalignments according to the exemplary embodiment are represented by any one of the following types or a combination of these types. The following types are only exemplifications, so that other types may be included.

Figure 4A:
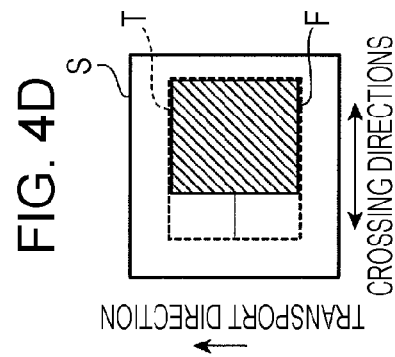
FIGS. 4A to 4H each illustrate a misalignment type.

As shown in FIG. 4A, lead register is a measure of the displacement of the position of the image F from the ideal position T in the transport direction.

Figure 4E:
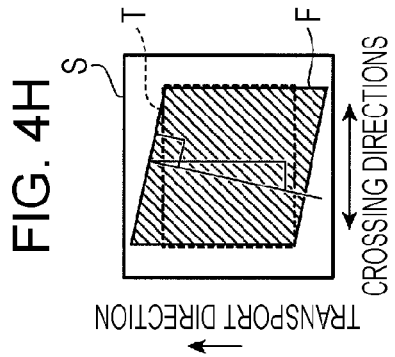
Figure 4B:
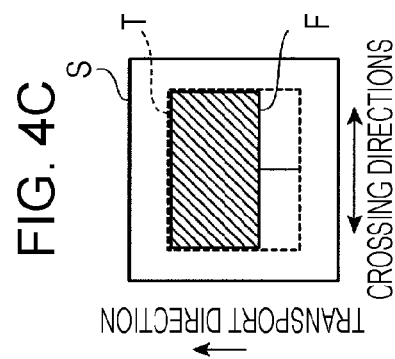

As shown in FIG. 4B, side register is a measure of the displacement of the position of the image F from the ideal position T in the crossing directions.

Figure 4F:
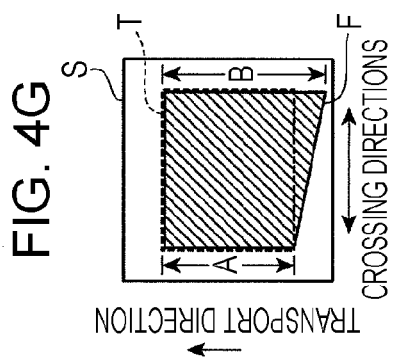
Figure 4C:
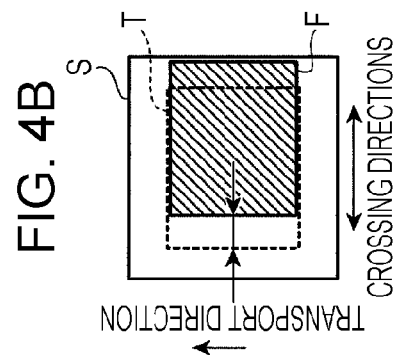

As shown in FIG. 4C, subscanning magnification is a measure of stretching and contraction of the image F in the transport direction.

Figure 4G:
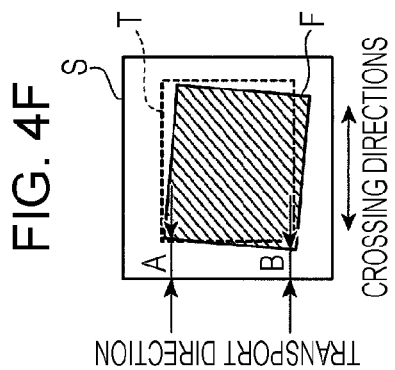
Figure 4D:
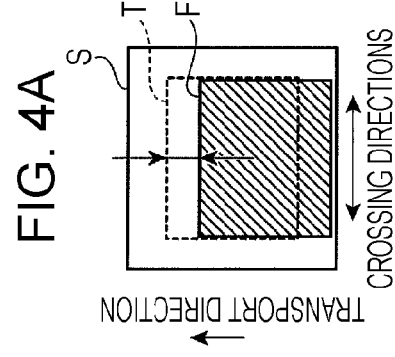

As shown in FIG. 4D, main scanning magnification is a measure of stretching and contraction of the image F in the crossing directions.

As shown in FIG. 4E, lead skew is a measure of tilting of the image F in the crossing directions. In the illustrated example, the lead skew is calculated on the basis of the difference between a distance A and a distance B.

As shown in FIG. 4F, side skew is a measure of tilting of the image F in the transport direction. In the illustrated example, the side skew is calculated on the basis of the difference between a distance A and a distance B.

As shown in FIG. 4G, parallelization is a measure of a state of angular displacement (distortion) of opposite sides of the image F. In the illustrated example, the angle formed by a leading end side and a trailing end side in the transport direction is calculated on the basis of the difference between a distance A and a distance B.

Figure 4H:
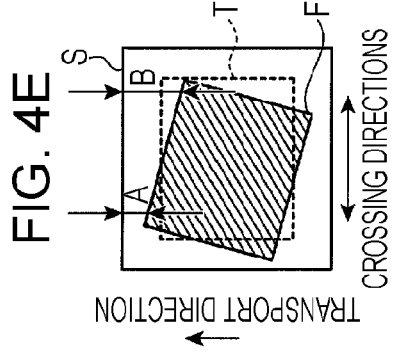

As shown in FIG. 4H, perpendicularity is a measure of how much a straight line that is orthogonal to the leading end side of image F in the transport direction is displaced from the ideal position T.

Test Chart TC

Figure 5:
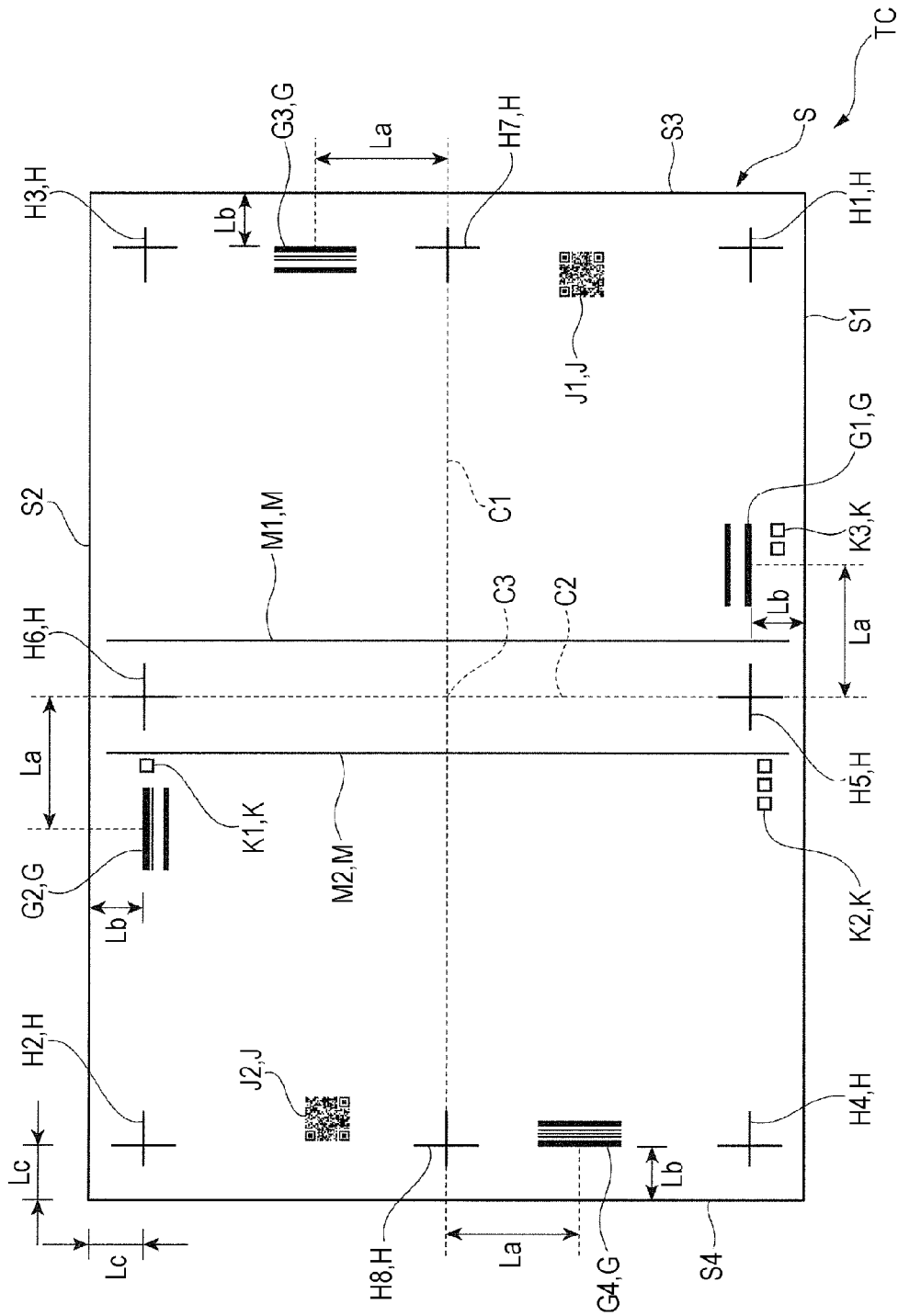
FIG. 5 illustrates a test chart to which the exemplary embodiment is applied.

FIG. 5 illustrates the test chart TC to which the exemplary embodiment is applied.

Next, with reference to FIGS. 3 to 5, the test chart TC according to the exemplary embodiment is described.

First, the test chart TC is a chart in which, by using the image forming unit 5, images that are stored in the mark image memory 26 are formed on a sheet S that is supplied from the sheet supplying unit 3. The image reading unit 9 reads the images in the test chart TC to ascertain misalignment amounts.

As shown in FIG. 5, the test chart TC includes, as images formed on the sheet S, the edge detecting marks G, the grid marks H, the two-dimensional bar codes J, the auxiliary images K, and the auxiliary lines M. Here, although not shown, the test chart TC also includes images corresponding to the images shown in FIG. 5 on a surface (back surface) that is opposite to the surface shown in FIG. 5. That is, in the test chart TC, images corresponding to those shown in FIG. 5 are formed on two surfaces (that is, the first surface and the second surface). The image reading unit 9 reads the test chart TC to ascertain the misalignment amounts for the first surface and the second surface. The test chart TC may naturally be one in which images corresponding the images shown in FIG. 5 are formed on either one of the first surface and the second surface (that is, one surface).

The edge detecting marks G, which are exemplary particular images, exemplary end portion detecting images, and an exemplary image group, are detecting images (marks) for detecting the end portions S1, S2, S3, and S4 of the sheet S. The edge detecting marks G are formed at the respective end portions S1 to S4 of the sheet S. More specifically, in the test chart TC, a total of four edge detecting marks, that is, the edge detecting marks G1, G2, G3, and G4, are formed. The shapes of the edge detecting marks G1 to G4 are described below.

The edge detecting marks G1 to G4 are formed at predetermined positions with respect to corresponding centerlines (that is, a first centerline C1 and a second centerline C2) between the end portions S1 and S2 and between the end portions S3 and S4 of the sheet S. When described further, the edge detecting marks G1 and G2 are disposed at respective predetermined sides of the centerline C2 and apart from the centerline C2 by a predetermined distance La. The edge detecting marks G3 and G4 are disposed at respective predetermined sides of the centerline C1 and apart from the centerline C1 by the predetermined distance La. The distance La is the same regardless of the sizes of sheets S. In other words, even if the sheet sizes differ, the distances between the edge detecting marks G1 and G2 in the test charts TC from the centerline C2 and the distances between the edge detecting marks G3 and G4 in the test charts TC from the centerline C1 are the same.

In the illustrated example, the length from the centerline C2 to the center of each of the edge detecting marks G1 and G2 in the direction along the end portions S1 and S2 and the length from the centerline C1 to the center of each of the edge detecting marks G3 and G4 in the direction along the end portions S3 and S4 correspond to the distance La. As viewed from the end portions S1 to S2, where the edge detecting marks G1 to G2 are formed, the edge detecting marks G1 to G2 are positioned on the right of the centerline C2. As viewed from the end portions S3 and S4, where the edge detecting marks G3 and G4 are formed, the edge detecting marks G3 and G4 are positioned on the right of the centerline C1. The edge detecting mark G1 and the edge detecting mark G2 are provided on opposite sides of the centerlines C1 and C2. The edge detecting mark G3 and the edge detecting mark G4 are provided on opposite sides of the centerlines C1 and C2.

The edge detecting marks G1 to G4 are disposed from the end portions S1 to S4, where the edge detecting marks G1 to G4 are formed, by predetermined a distance Lb. The distance Lb is the same regardless of the sizes of sheets S. In other words, even if the sheet sizes differ, the distances of the edge detecting marks G1 to G4, which are formed in the test chart TC, from the respective end portions S1 to S4 are the same.

When described further, the edge detecting marks G at opposing end portions S1 and S2 and the edge detecting marks G at opposing end portions S3 and S4 on the sheet S (that is, a combination of the edge detecting marks G1 and G2 and a combination of the edge detecting marks G3 and G4) are disposed point symmetrically about a crossing point C3 of the centerline C1 and the centerline C2. The crossing point C3 may be assumed as being provided at the center of gravity of the sheet S. The edge detecting marks G1 to G4 may be considered as being provided at point symmetric positions around the center of gravity of the sheet S.

The grid marks H are images for detecting the image formation positions or the misalignment amounts of images. The grid marks H are what are called crossmarks having the shapes of crosses, each being formed by two straight lines that are orthogonal to each other along corresponding ones of the end portions S1 to S4 of the sheet S. The illustrated test chart TC includes a total of eight grid marks, that is, grid marks H1, H2, H3, H4, H5, H6, H7, and H8. The grid marks H1 to H4 are formed at the four corners of the sheet S. The grid marks H5 to H8 are formed adjacent to the respective end portions S1 to S4 of the sheet S. The grid marks H5 and H6 are formed on the centerline C2 and the grid marks H7 and H8 are formed on the centerline C1.

The grid marks H1 to H8 are formed at predetermined positions with respect to the corresponding end portions S1 to S4 adjacent thereto. More specifically, the grid marks H1 to H8 are disposed apart from the corresponding end portions S1 to S4 adjacent thereto by a predetermined distance Lc.

The two-dimensional bar codes J are images that contain predetermined information. In the illustrated example, a total of two two-dimensional bar codes J, that is, a two-dimensional bar code J1 and a two-dimensional bar code J2, are formed adjacent to the end portion S3 and to the end portion S4 of the sheet S, respectively. The two-dimensional bar codes J1 and J2 contain information regarding from which of the first tray 31 to the third tray 33 sheets S have been supplied, which number test chart TC is provided when multiple test charts TC are consecutively formed, and whether the surface of each of the sheets S is the first surface or the second surface. The two-dimensional bar codes J1 and J2 may contain information regarding the sizes (such as A3 and B5) of sheets S.

The auxiliary images K (K1, K2, and K3) and the auxiliary lines M (M1 and M2) are detecting images for detecting information other than the pieces of information that the edge detecting marks G, the grid marks H, and the two-dimensional bar codes J contain, that is, for example, information for detecting the densities of different colors of images that are formed.

Edge Detecting Marks G1 to G4

FIGS. 6A to 6D each illustrate an edge detecting mark G to which the exemplary embodiment is applied.

Next, with reference to FIGS. 6A to 6D, the edge detecting marks G (G1 to G4) according to the exemplary embodiment are described.

As described above, the edge detecting marks G1 to G4 according to the exemplary embodiment are provided adjacent to the respective end portions S1 to S4 of a sheet S and their forms differ from each other. By distinguishing between the forms of the edge detecting marks G1 to G4, it is possible to recognize the end portions S1 to S4 where the respective edge detecting marks G1 to G4 are formed.

As shown in FIGS. 6A to 6D, the edge detecting mark G1 includes a combination of a start line G11 and an end line G12; the edge detecting mark G2 includes a combination of a start line G11, an end line G12, and an identification line G13; the edge detecting mark G3 includes a combination of a start line G11, an end line G12, and identification lines G13 and G14; and the edge detecting mark G4 includes a combination of a start line G11, an end line G12, and identification lines G13, G14, and G15. The start lines G11, the end lines G12, and the identification lines G13 to G15 form images of substantially rectangular shapes (including straight lines, lines) extending along the corresponding sheet end portions S1 to S4.

The start lines G11 are disposed adjacent to the respective end portions S1 to S4 of the sheet S. The end lines G12 are disposed closer to the center of the sheet S than the start lines G11 in a plane of FIGS. 6A to 6D. The identification lines G13 to G15 are provided between the start lines G11 and end lines G12 corresponding to the identification lines G13 to G15.

Here, as described below, the start lines G11 indicate that edges have started passing the edge detecting marks G when the edge detecting marks G are detected while being scanned (refer to the arrows in FIGS. 6A to 6D). The start lines G11 are wider (thicker) than the end lines G12 and the identification lines G13 to G15.

The end lines G12 indicate that the edges have finished passing the edge detecting marks G when the edge detecting marks G are detected while being scanned. The end lines G12 are narrower than the start lines G11 and wider than the identification lines G13 to G15.

The identification lines G13 to G15 are images for identifying the sheet end portions S1 to S4. The identification lines G13 to G15 have the same widths and are narrower (thinner) than the start lines G11 and the start lines G12.

Here, as shown in FIGS. 6A to 6D, the edge detecting mark G1 does not include the identification lines G13 to G15 (zero identification lines), the edge detecting mark G2 includes one identification line G13 (one identification line), the edge detecting mark G3 includes the identification lines G13 and G14 (two identification lines), and the edge detecting mark G4 includes the identification lines G13 to G15 (three identification lines). In the exemplary embodiment, by counting the number of identification lines between the start line G11 and the end line G12, it is ascertained which of the edge detecting marks G1 to G4 a certain edge detecting mark is.

As long as it is ascertained which of the edge detecting marks G1 to G4 a certain edge detecting mark is, other structures may be used. Examples thereof include a structure in which the densities of the edge detecting marks G1 to G4 differ from each other, a structure in which the thicknesses of the lines of the edge detecting marks G1 to G4 differ from each other, and a structure in which the types of lines of the edge detecting marks G1 to G4 differ from each other.

Detection of End Portions S1 to S4

Figure 7A:
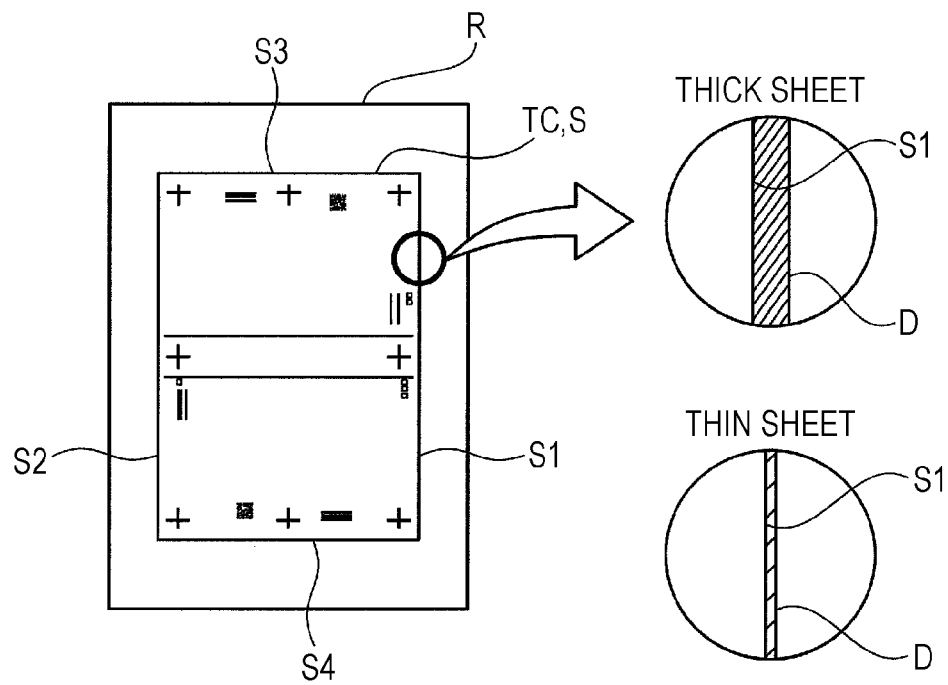
FIGS. 7A and 7B each illustrate a read image.
Figure 7B:
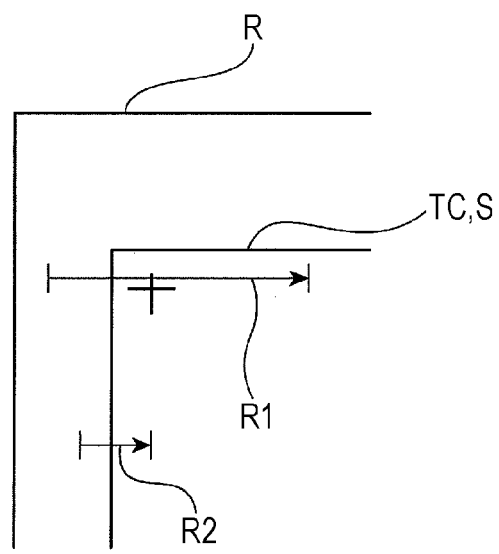

FIGS. 7A and 7B each illustrate a read image R. More specifically, FIG. 7A illustrates the vicinity of the end portions S1 to S4 of the test chart TC in the read image R. FIG. 7B illustrates a search region in the read image R.

As described above, for ascertaining the misalignment amounts, the image reading unit 9 reads the images in the test chart TC. While transporting the test chart TC by the sheet transporting unit 91, the image reading unit 9 reads the images on the first surface and the images on the second surface of the test chart TC by using the first image sensor 92 and the second image sensor 94 (refer to FIG. 1).

FIG. 7A illustrates the read image R, which correspond to the images on the first surface of the test chart TC that has been read while being transported by the sheet transporting unit 91. As a result of capturing, as an image, a region that is wider than the test chart TC, the read image R is an image including the end portions S1 to S4 of the test chart TC. When described further, the read image R corresponds to an image that also includes a portion other than the test chart TC (that is, the background). The read image R includes the end portions S1 to S4 of the test chart TC for ascertaining the misalignment amounts on the basis of, for example, the positions of the end portions S1 to S4 and the positions of the grid marks H of the test chart TC in the read image R.

When analyzing the read image R for ascertaining the misalignment amounts, it may be difficult to detect the end portions S1 to S4. More specifically, when the color of the test chart TC (the sheet S), for example, is the same as the color of the first supporting member 95 or the second supporting member 96 (serving as the background of the test chart TC) or resembles the background color so closely that it is difficult to distinguish it from the background color (for example, both of them are white), the contrast between the test chart TC and the background thereof in the read image R becomes low. This low contrast state makes it difficult to detect the end portions S1 to S4.

As shown in FIG. 7A, the densities of shadows D that are formed in accordance with the thicknesses of sheets S (that is, shadows D formed by floating of the sheets S in accordance with the thicknesses of the sheets S) are such that the densities of the shadows D when the sheets S are thick differ from those of the shadows D when the sheets S are thin. In particular, the shadows D when the sheets S are thin sheets may become thin. Even in the state in which the densities of the shadows D are low, it becomes difficult to detect the end portions S1 to S4.

Therefore, in the exemplary embodiment, the positions of the end portions S1 to S4 are previously ascertained (predicted or estimated). This allows the region that is searched for detecting the end portions S1 to S4 (that is, the search region or a scanning region) to be narrow. That is, by narrowing the search region, the speed with which the process of analyzing the read image R is performed is increased.

As shown in FIG. 7B, compared to a wide search region (refer to symbol R1 in FIG. 7B), a narrower search region (refer to symbol R2 in FIG. 7B) suppresses detection of images other than those in the test chart, that is, images that cause errors, such as stains and dirt, in the read image R. As a result, erroneous detections of the end portions S1 to S4 are reduced.

FIGS. 8A to 8E each illustrate an operation for detecting the end portions S1 to S4 of the test chart TC to which the exemplary embodiment is applied. In FIGS. 8A to 8E, for clarification, some of the images that are formed in the test chart, such as the grid marks H (refer to FIG. 5), are not shown.

Next, with reference to FIGS. 8A to 8E, the operations for detecting the end portions S1 to S4 in the read image R are described in detail. The operations for detecting the end portions S1 to S4 below are executed by the image analyzing unit 24 of the general controller 10 (refer to FIG. 3).

First, as shown in FIG. 8A, with positions C5 and C6 (situated at outer edges of the read image R and being separated by a predetermined distance La in the crossing directions from a centerline (crossing centerline) C4 along the transport direction in the read image R) being starting points, scanning is performed along the transport direction and towards the center of the sheet (refer to arrows R3 and R4 in FIG. 8A). By performing the scanning, the edge detecting marks G3 and G4 are detected.

Since the edge detecting marks G1 to G4 are formed with the predetermined widths in the directions along the respective end portions S1 to S4, even if the positions of the edge detecting marks G1 to G4 are displaced, the displacements of the edge detecting marks G1 to G4 from the scanning regions (refer to symbols R3 and R4 in FIG. 8A) are reduced.

For example, in the step shown in FIG. 8A, when it is identified which of the edge detecting marks G1 to G4 a detected edge detecting mark G is, the orientation of the test chart TC is ascertained. More specifically, in the example shown in FIG. 8A, since the edge detecting mark G3 is detected in the scanning region where the position C5 at the leading end in the transport direction in the read image R is the starting point, it is ascertained that the test chart TC is oriented with the end portion S3 being disposed at the leading end in the transport direction.

Next, as shown in FIG. 8B, on the basis of the positions of the detected edge detecting marks G3 and G4, a midpoint C7 in the transport directions of the edge detecting marks G3 and G4 is calculated. Then, a crossing line C8 that passes through the calculated midpoint C7 and that extends along the crossing directions is specified.

Next, as shown in FIG. 8C, with positions C9 and C10 (situated at outer edges of the read image R and being separated by the predetermined distance La in the transport direction from the crossing line C8) being starting points, scanning is performed along the crossing directions and towards the center of the sheet (refer to arrows R5 and R6 in FIG. 8C). By performing the scanning, the edge detecting marks G1 and G2 are detected.

As shown in FIG. 8D, with the detected edge detecting marks G1 to G4 serving as references, a search region R7 (refer to FIG. 8E), which is a region that is searched for detecting the end portions S1 to S4, is determined. When described further, first, from the edge detecting marks G1 to G4, it is predicted that the end portions S1 to S4 exist at positions of the outer edges of the test chart TC (sheet S) that are separated by a predetermined distance Lb from the edge detecting marks G1 to G4. Here, the positions of the detected edge detecting marks G1 to G4 may vary due to misalignments. Therefore, a region in a range having a predetermined width Ld with the expected positions of the end portions S1 to S4 as centers is determined as the search region R7 (refer to FIG. 8E).

As shown in FIG. 8E, the search region R7 is a portion of the read image R. Therefore, when the search region R7 is determined, it becomes unnecessary to search the entire read image R for detecting the end portions S1 to S4. Consequently, the area of the region to be searched is reduced. Thus, it becomes possible to speed up the process of detecting the end portions S1 to S4 or to perform the process with high resolution.

Here, when detecting the edge detecting marks G, the positions that are at the outer edges of the read image R and that are separated by the predetermined distance La from the centerline C4 or the crossing line C8 are scanned due to the following reasons.

First, logically speaking, the centerlines C1 and C2 of the test chart TC are aligned with the centerlines C4 and C8 of the read image R, respectively. As described with reference to FIG. 5, the edge detecting marks G1 and G2 are formed at the predetermined distance La from the centerline C2 of the test chart TC (sheet S) and the edge detecting marks G3 and G4 are formed at the predetermined distance La from the centerline C1 of the test chart TC (sheet S). Therefore, scanning the positions that are separated by the distance La from the centerlines C4 or C8 in the read image R increases the possibility of detecting the edge detecting marks G1 to G4.

In the exemplary embodiment, by using the edge detecting marks G1 to G4 having high contrast instead of by directly searching for the end portions S1 to S4 having low contrast, the end portions S1 to S4 are detected with higher precision.

The operation for determining the search region R7 for searching for the end portions S1 to S4 while using the edge detecting marks G1 to G4 is also executed when the orientation of the illustrated example and the orientation of the test chart TC differ from each other or when test charts TC of other sheet sizes are used. In other words, the above-described algorithm for executing the operations for detecting the end portions S1 to S4 is also applied regardless of the orientation of the test chart TC on the image reading unit 9 and the sheet size of the test chart TC.

When described further, for example, if a test chart TC having a small sheet size is used, the orientation of the test chart TC on the image reading unit 9 may be such that the long end portion S1 or S2 of the test chart TC are disposed at a leading end in the transport direction or the short end portion S3 or S4 of the test chart TC is disposed at the leading end in the transport direction. In the exemplary embodiment, regardless of which orientation the test chart TC is disposed, the operations for detecting the end portions S1 to S4 are executed, so that the operability is ensured for a user.

UI Screen

Figure 9A:
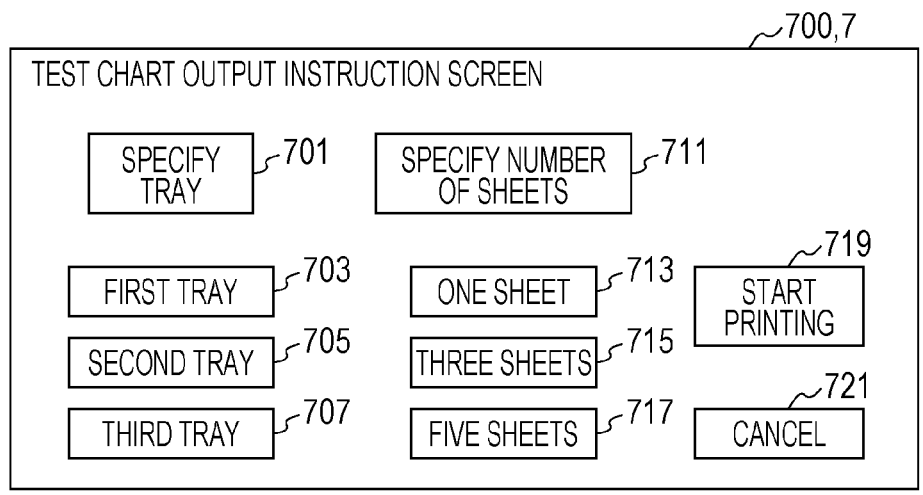
FIGS. 9A and 9B each illustrate a screen whose contents are displayed on a user interface (UI) when performing alignment.
Figure 9B:
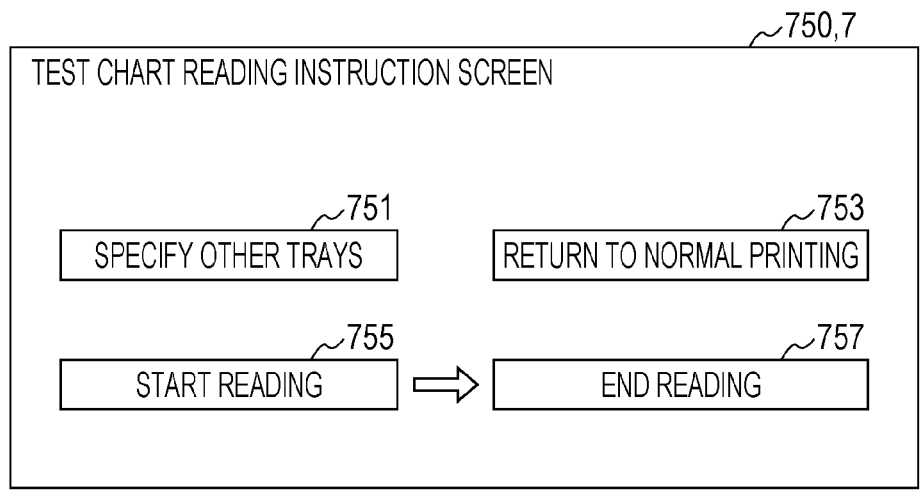

FIGS. 9A and 9B each illustrate a screen whose contents are displayed on the UI 7 when performing alignment. More specifically, FIG. 9A illustrates the test chart output instruction screen 700 and FIG. 9B illustrates the test chart reading instruction screen 750.

Next, with reference to FIGS. 9A and 9B, the screen whose contents are displayed on the UI 7 when performing alignment is described.

First, the test chart output instruction screen 700 shown in FIG. 9A is described. The contents of the test chart output instruction screen 700 are displayed on the UI 7 when the test chart output instruction screen 700 receives an instruction from a user as a result of a predetermined operation, such as the user touching an aligning button (not shown) that is displayed on the UI 7.

The test chart output instruction screen 700 is a screen that receives a test chart output instruction from the user. In the illustrated example, the test chart output instruction screen 700 includes a "specify tray" button 701, a "specify number of sheets" button 711, a "start printing" button 719, and a "cancel" button 721.

The "specify tray" button 701 receives an instruction for specifying a tray of the sheet supplying unit 3 that supplies a sheet S that becomes a test chart TC. In the illustrated example, the "specify tray" button 701 includes a "first tray" button 703 that specifies the supply of a sheet S from the first tray 31, a "second tray" button 705 that specifies the supply of a sheet S from the second tray 32, and a "third tray" button 707 that specifies the supply of a sheet S from the third tray 33.

The "specify number of sheets" button 711 receives an instruction for specifying how many sheets S are to be supplied from the tray of the sheet supplying unit 3 that has been specified by the "specify tray" button 701. In the illustrated example, the "specify number of sheets" button 711 includes a "one sheet" button 713 that specifies the supply of one sheet, a "three sheet" button 715 that specifies the supply of three sheets, and a "five sheet" button 717 that specifies the supply of five sheets. As described below, by calculating the average value of the misalignment amounts of multiple test charts TC, it is possible to precisely ascertain the misalignment amounts as the number of specified sheets increases. In contrast, as the number of specified sheets is decreased, the time required for performing alignment is reduced.

After receiving the instruction for specifying a tray of the sheet supplying unit 3 by the "specify tray" button 701 and the instruction for specifying the number of sheets S by the "specify number of sheets" button 711, the "start printing" button 719 receives an instruction for printing a test chart TC in accordance with the specifying instructions.

The "cancel" button 721 receives an instruction for ending the process without printing a test chart TC.

When a user presses the "start printing" button 719, that is, when an instruction for printing a test chart TC is received, the test chart TC is output. For example, when the "start printing" button 719 is pressed or when the output of the test chart TC is completed, the contents of the test chart reading instruction screen 750 shown in FIG. 9B are displayed.

The test chart reading instruction screen 750 shown in FIG. 9B is a screen that receives an instruction for reading the output test chart TC by using the image reading unit 9. In the illustrated example, the test chart reading instruction screen 750 includes an "add tray" button 751, a "return to normal printing" button 753, a "start reading" button 755, and a "end reading" button 757.

Before reading the test chart T by the image reading unit 9, the "add tray" button 751 receives an instruction for supplying sheets S from trays other than the first tray 31, the second tray 32, or the third tray 33 that has already supplied the sheet S (which becomes the test chart TC) and that outputs the test chart TC. By operating the "add tray" button 751, the contents of the test chart output instruction screen 700 (refer to FIG. 9A) are displayed again.

The "return to normal printing" button 753 ends the process of correcting misalignments without reading a test chart TC and receives an instruction for returning to a normal image formation operation.

The "start reading" button 755 is operated by the user after the output test chart TC has been placed on the image reading unit 9, to receive an instruction for reading the test chart TC.

The "end reading" button 757 is operated by the user when the reading of the test chart TC ends and there are no more test charts TC to be read. In the illustrated example, by operating the "end reading" button 757, the misalignment amounts are corrected in accordance with the images in the read test chart TC.

Aligning Process

Figure 10:
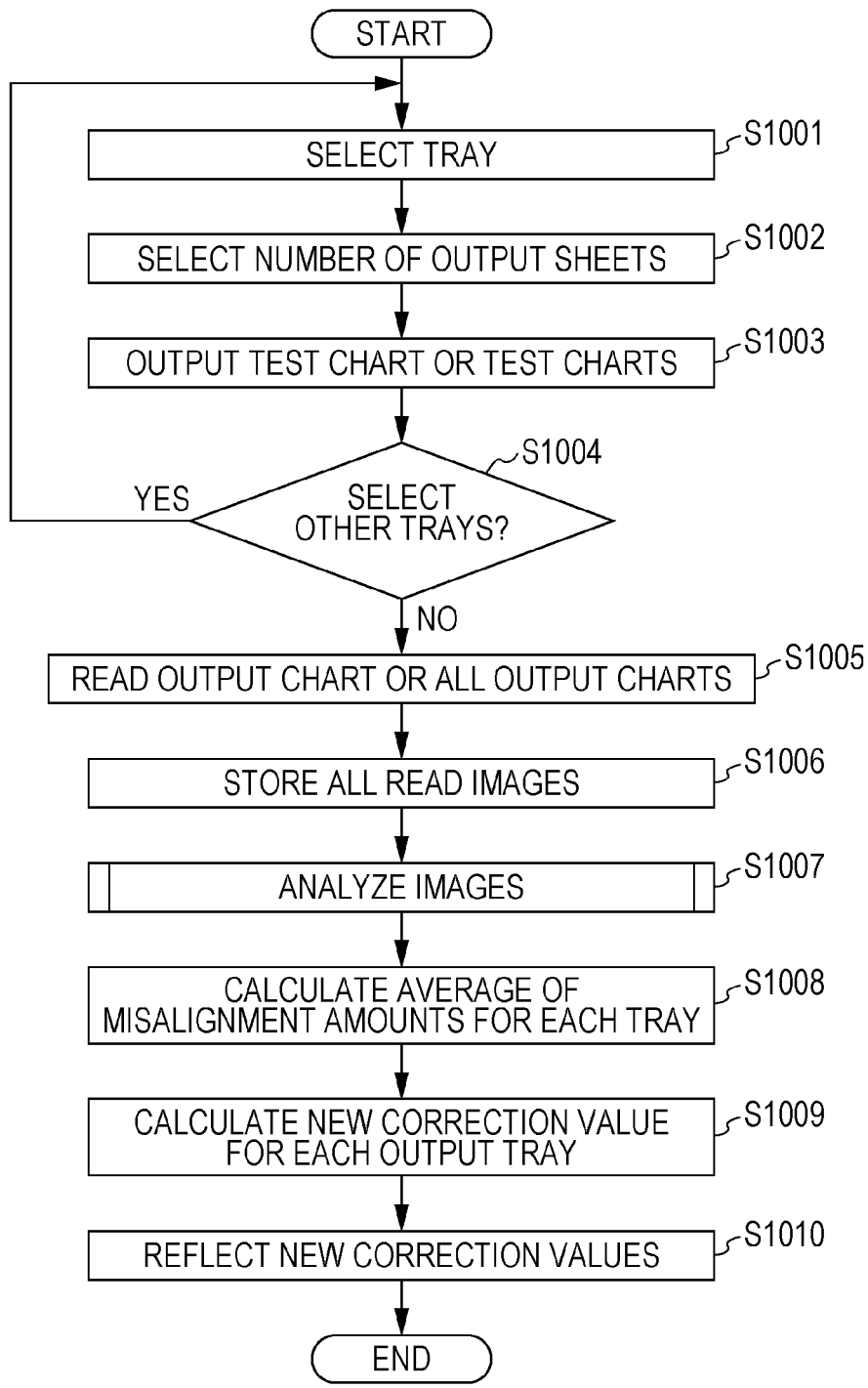
FIG. 10 is a flowchart of exemplary operations for performing an aligning process according to the exemplary embodiment.

FIG. 10 is a flowchart of exemplary operations for performing an aligning process according to the exemplary embodiment. The operations illustrated in FIG. 10 are started with the contents of the test chart output instruction screen 700 being displayed on the UI 7.

First, the test chart outputting unit 22 receives an instruction for specifying a tray of the sheet supplying unit 3 that supplies a sheet S that becomes a test chart TC by using the "specify tray" button 701 on the test chart output instruction screen 700 (Step S1001). The test chart outputting unit 22 also receives an instruction for specifying the number of outputs of test charts TC by using the "specify number of sheets" button 711 (Step S1002). Further, the test chart outputting unit 22 outputs a test chart TC when the test chart outputting unit 22 receives an instruction for outputting the test chart TC by using the "start printing" button 719 (Step S1003).

Next, the test chart reading unit 23 determines whether or not to receive an instruction for supplying sheets S from other trays (that is, an instruction for outputting test charts TC for the other trays) by using the "add tray" button 51 on the test chart reading instruction screen 750 (Step S1004). Here, when test charts TC are to be output from other trays ("YES" in Step S1004), the contents of the test chart output instruction screen 700 are displayed again and the test chart output instruction screen receives an instruction for specifying trays of the sheet supplying unit 3 that supplies the sheets S that become test charts TC by using the "specify tray" button 701 (Step S1001).

In contrast, when test charts TC are not to be output from other trays ("NO" in Step S1004), the test chart reading unit 23 reads the test chart TC when the test chart reading unit 23 receives an instruction by using the "reading start" button 755 on the test chart reading instruction screen 750 (Step S1005). Here, when multiple test charts TC have been output, all of the test charts TC are consecutively read. The images in the read test chart TC are stored in the read image memory 27 (Step S1006).

Next, the image analyzing unit 24 analyzes the images in the test chart TC stored in the read image memory 27 when the image analyzing unit 24 receives an instruction that the reading of the test chart TC has been completed by using the "end reading" button 757 (Step S1007 described later).

Next, on the basis of the results of analysis, the image analyzing unit 24 calculates the misalignment amounts for the first tray 31, second tray 32, and third tray 33 (Step S1008) and stores the calculated results in the misalignment amount memory 28.

Next, on the basis of the misalignment amounts stored in the misalignment amount memory 28, the image analyzing unit 24 calculates correction values for correcting the misalignment amounts for the first tray 31, second tray 32, and third tray 33 (Step S1009). Then, in accordance with the calculated correction values, the misalignment amount correcting unit 25 corrects the misalignments for the first tray 31, second tray 32, and third tray 33 (Step S1010). More specifically, various corrections, such as image-related corrections (including corrections of the position of formation of an image that is formed by the image forming unit 5 and the magnification of an image) and sheet-S-related corrections (including corrections of the sheet loading positions in the first tray 31 to the third tray 33 and corrections of timings in which sheets S that are supplied from the first tray 31, the second tray 32, and the third tray 33 are fed).

Process of Analyzing Test Chart Images

Figure 11:
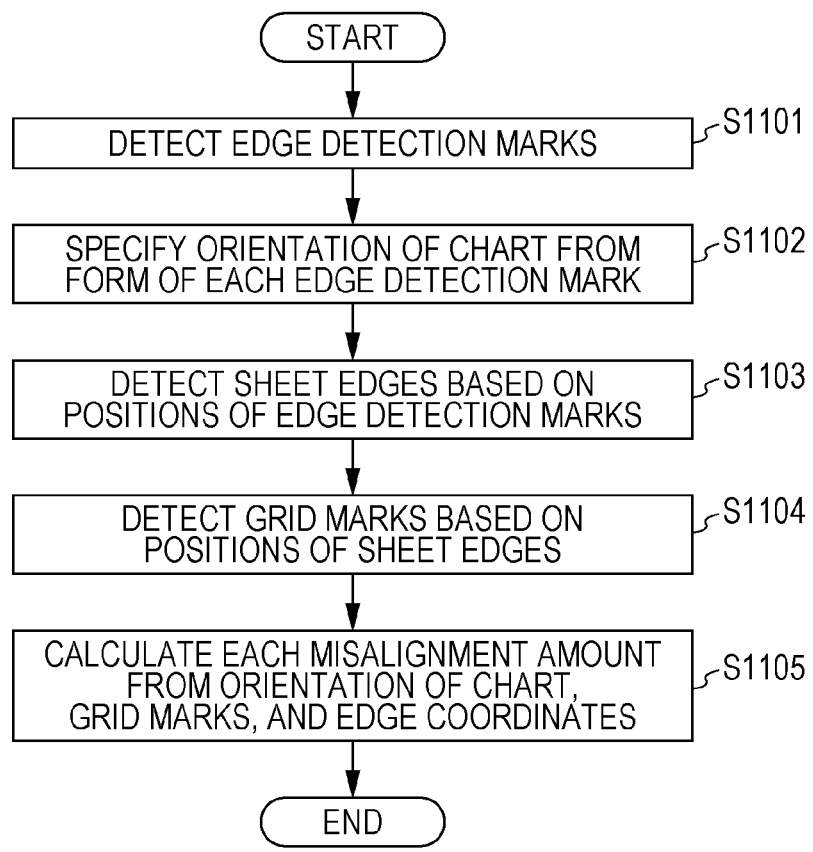
FIG. 11 is a flowchart of exemplary operations of a process of analyzing test chart images according to the exemplary embodiment.

FIG. 11 is a flowchart of exemplary operations of a process of analyzing test chart images according to the exemplary embodiment.

Next, with reference to FIGS. 5, 6, 10, and 11, the exemplary operations of the process of analyzing the images in a test chart TC by the image analyzing unit 24 are described in detail (refer to Step S1007 in FIG. 10).

First, the image analyzing unit 24 detects the edge detecting marks G1 to G4 that are formed at the respective end portions S1 to S4 (Step S1101). The process of detecting the edge detecting marks G is as described with reference to the aforementioned FIG. 8A to and 8E.

From the orientations of the detected edge detecting marks G, the image analyzing unit 24 determines the orientation of the test chart TC that has been placed on the image reading unit 9 (Step S1102).

From the dispositions of the edge detecting marks G, the image analyzing unit 24 searches for the end portions S1 to S4 of the test chart TC and detects the coordinates of the end portions S1 to S4 (end portion coordinates) (Step S1103). The end portions S1 to S4 of the test chart TC are detected by searching the inside of the search region R7 shown in FIG. 8E.

From the detected coordinates of the end portions S1 to S4, the image analyzing unit 24 detects the grid marks H (Step S1104).

Then, on the basis of the orientation of the test chart TC obtained in Step S1102, the end portion coordinates obtained in Step S1103, and the positions of the grid marks H obtained in Step S1104, the misalignment amounts are calculated (Step S1105).

Modifications

Although, in the description above, the case in which the read image memory 27 stores the images that have been read for the first tray 31, the second tray 32, and the third tray 33 is described, the images may be stored in accordance with smaller divisions. For example, the images may be stored for different categories of sheets such as different sizes, types, or thicknesses of sheets S that are loaded in the first tray 31 to the third tray 33. By correcting the misalignment amounts by analyzing the images stored for such different categories of sheets, the misalignment amounts that are changeable in accordance with the categories of sheets are capable of being more precisely corrected.

Although, in the foregoing description, the case in which an test chart TC is formed by the image forming unit 5 is described, other cases are possible. For example, a test chart TC in which the positions of the edge detecting marks G in the test chart TC shown in FIG. 5 are guaranteed to be at the corresponding distances La and Lb and in which the positions of the grid marks H in the test chart TC shown in FIG. 5 are guaranteed to be at the distance Lc may be formed by, for example, another image forming unit (not shown). The image reading unit 9 of the image forming apparatus 1 reads the images in the test chart TC. By this, when, in the images read by the image reading unit 9, the positions of the edge detecting marks G and the positions of the grid marks H are determined as being displaced from the guaranteed positions, the sheet transporting unit 91, the first image sensor 92, and the second image sensor 94 are capable of being adjusted on the basis of the displacement amounts. That is, the displacements caused by the reading of the images by the image reading unit 9 are capable of being corrected.

In the foregoing description, when, in Step S1005 shown in FIG. 10, test charts TC are to be read and multiple test charts TC have been output, all of the test charts TC are consecutively read. However, in reading the test charts TC, it is possible to read the two-dimensional bar codes J and determine whether or not all of the test charts TC that have been output in Steps S1003 and S1004 in FIG. 10 have been read. When all of the test charts TC have not been read, for example, the UI 7 may display a message urging a user to place all of the test charts TC on the image reading unit 9 and execute a reading operation again, or a message urging a user to place the test charts TC that have not been read on the image reading unit 9 and execute an additional reading operation. This allows all of the test charts TC to be reliably read.

Although, in the foregoing description, the case in which the image reading unit 9 reads the images while a test chart TC is transported by the sheet transporting unit 91 is described, other cases are possible. That is, for example, the images may be read by the second image sensor 94 while the mirror 93 scans the images in the test chart TC that is disposed (fixed) at a predetermined position without transporting the test chart TC by the sheet transporting unit 91. Even for the images that have been read in such a case, misalignments are capable of being corrected as described with reference to, for example, FIGS. 8A to 8E and FIG. 11.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an image forming unit configured to form an original, the original comprising a recording medium;
    a sending unit configured to send the original formed by the image forming unit;
    a reading unit configured to read an image of the original that is sent by the sending unit;
    a detecting unit configured to detect, from the image read by the reading unit, an end portion detecting image formed at a predetermined position of the original;
    a determining unit configured to determine a search region for searching for an end portion of the original, the end portion being included in the image read by the reading unit, in response to recognizing the predetermined position of the end portion detecting image detected by the detecting unit; and
    a searching unit configured to search inside the search region and to detect the end portion.

2. The image forming apparatus according to claim 1, wherein a plurality of the end portion detecting images are each formed at a corresponding one of a plurality of the end portions of the original,
    wherein two of the end portion detecting images are each formed at a corresponding one of two end portions along a feeding direction of the original, each of the two end portion detecting images being formed at a position that is separated by a predetermined distance from a first centerline of the original in the feeding direction, and wherein two of the end portion detecting images are each formed at a corresponding one of two end portions along a crossing direction that crosses the feeding direction of the original, each of the two end portion detecting images being formed at a position that is separated by the predetermined distance from a second centerline of the original in the crossing direction.

3. The image forming apparatus according to claim 2, wherein the plurality of end portion detecting images are formed at point symmetric positions around a point where the first centerline and the second centerline cross each other.

4. The image forming apparatus according to claim 2, wherein, even if a plurality of the originals have different sheet sizes, each of the predetermined distances at which the end portion detecting images are formed is the same.

5. The image forming apparatus according to claim 3, wherein, even if a plurality of the originals have different sheet sizes, each of the predetermined distances at which the end portion detecting images are formed is the same.

6. The image forming apparatus according to claim 2, wherein the end portion detecting images each include one or a plurality of lines along the corresponding one of the end portions of the original on which each of the end portion detecting images is formed, and wherein the number of lines differs for the end portions.

7. The image forming apparatus according to claim 3, wherein the end portion detecting images each include one or a plurality of lines along the corresponding one of the end portions of the original on which each of the end portion detecting images is formed, and wherein the number of lines differs for the end portions.

8. The image forming apparatus according to claim 4, wherein the end portion detecting images each include one or a plurality of lines along the corresponding one of the end portions of the original on which each of the end portion detecting images is formed, and wherein the number of lines differs for the end portions.

9. The image forming apparatus according to claim 5, wherein the end portion detecting images each include one or a plurality of lines along the corresponding one of the end portions of the original on which each of the end portion detecting images is formed, and wherein the number of lines differs for the end portions.

10. The image forming apparatus according to claim 2, wherein the detecting unit is configured to detect the end portion detecting images of the end portions along the crossing direction while moving along a crossing centerline with respect to positions that are separated by the predetermined distance from the crossing centerline, the crossing center line being a centerline in the crossing direction of the image read by the reading unit, and wherein the detecting unit is configured to detect the end portion detecting images of the end portions along the feeding direction while moving along the crossing direction with respect to positions that are separated by a predetermined distance from a midpoint passing line along the crossing direction that passes a midpoint in the feeding direction between the detected end portion detecting images of the end portions along the crossing direction.

11. The image forming apparatus according to claim 3, wherein the detecting unit is configured to detect the end portion detecting images of the end portions along the crossing direction while moving along a crossing centerline with respect to positions that are separated by the predetermined distance from the crossing centerline, the crossing center line being a centerline in the crossing direction of the image read by the reading unit, and wherein the detecting unit is configured to detect the end portion detecting images of the end portions along the feeding direction while moving along the crossing direction with respect to positions that are separated by a predetermined distance from a midpoint passing line along the crossing direction that passes a midpoint in the feeding direction between the detected end portion detecting images of the end portions along the crossing direction.

12. The image forming apparatus according to claim 4, wherein the detecting unit is configured to detect the end portion detecting images of the end portions along the crossing direction while moving along a crossing centerline with respect to positions that are separated by the predetermined distance from the crossing centerline, the crossing center line being a centerline in the crossing direction of the image read by the reading unit, and wherein the detecting unit is configured to detect the end portion detecting images of the end portions along the feeding direction while moving along the crossing direction with respect to positions that are separated by a predetermined distance from a midpoint passing line along the crossing direction that passes a midpoint in the feeding direction between the detected end portion detecting images of the end portions along the crossing direction.

13. The image forming apparatus according to claim 5, wherein the detecting unit is configured to detect the end portion detecting images of the end portions along the crossing direction while moving along a crossing centerline with respect to positions that are separated by the predetermined distance from the crossing centerline, the crossing center line being a centerline in the crossing direction of the image read by the reading unit, and wherein the detecting unit is configured to detect the end portion detecting images of the end portions along the feeding direction while moving along the crossing direction with respect to positions that are separated by a predetermined distance from a midpoint passing line along the crossing direction that passes a midpoint in the feeding direction between the detected end portion detecting images of the end portions along the crossing direction.

14. The image forming apparatus according to claim 6, wherein the detecting unit is configured to detect the end portion detecting images of the end portions along the crossing direction while moving along a crossing centerline with respect to positions that are separated by the predetermined distance from the crossing centerline, the crossing center line being a centerline in the crossing direction of the image read by the reading unit, and wherein the detecting unit is configured to detect the end portion detecting images of the end portions along the feeding direction while moving along the crossing direction with respect to positions that are separated by a predetermined distance from a midpoint passing line along the crossing direction that passes a midpoint in the feeding direction between the detected end portion detecting images of the end portions along the crossing direction.

15. The image forming apparatus according to claim 7, wherein the detecting unit is configured to detect the end portion detecting images of the end portions along the crossing direction while moving along a crossing centerline with respect to positions that are separated by the predetermined distance from the crossing centerline, the crossing center line being a centerline in the crossing direction of the image read by the reading unit, and wherein the detecting unit is configured to detect the end portion detecting images of the end portions along the feeding direction while moving along the crossing direction with respect to positions that are separated by a predetermined distance from a midpoint passing line along the crossing direction that passes a midpoint in the feeding direction between the detected end portion detecting images of the end portions along the crossing direction.

16. The image forming apparatus according to claim 8, wherein the detecting unit is configured to detect the end portion detecting images of the end portions along the crossing direction while moving along a crossing centerline with respect to positions that are separated by the predetermined distance from the crossing centerline, the crossing center line being a centerline in the crossing direction of the image read by the reading unit, and wherein the detecting unit is configured to detect the end portion detecting images of the end portions along the feeding direction while moving along the crossing direction with respect to positions that are separated by a predetermined distance from a midpoint passing line along the crossing direction that passes a midpoint in the feeding direction between the detected end portion detecting images of the end portions along the crossing direction.

17. The image forming apparatus according to claim 9, wherein the detecting unit is configured to detect the end portion detecting images of the end portions along the crossing direction while moving along a crossing centerline with respect to positions that are separated by the predetermined distance from the crossing centerline, the crossing center line being a centerline in the crossing direction of the image read by the reading unit, and wherein the detecting unit is configured to detect the end portion detecting images of the end portions along the feeding direction while moving along the crossing direction with respect to positions that are separated by a predetermined distance from a midpoint passing line along the crossing direction that passes a midpoint in the feeding direction between the detected end portion detecting images of the end portions along the crossing direction.

18. An image forming apparatus comprising:
an image forming unit configured to form an original, the original comprising a recording medium;
a reading unit configured to read an image of the original fed by a sending unit, the original including a particular image formed by the image forming unit;
a detecting unit configured to detect the particular image from the image read by the reading unit;
a determining unit configured to determine a search region for searching for an end portion of the original, the end portion being included in the image read by the reading unit, in response to recognizing a position of the particular image detected by the detecting unit; and
a searching unit configured to search inside the search region and to detect the end portion.

19. An image position detecting original comprising:
a recording medium including four end portions; and
an image group comprising end portion detecting images formed at the four end portions of the recording medium,
wherein the ones of the end portion detecting images formed at opposing ones of the end portions of the recording medium are formed at point symmetric positions around a center of gravity of the recording medium,
wherein the end portion detecting images each include one or a plurality of lines along the corresponding one of the four end portions of the original on which each of the end portion detecting images is formed, and
wherein a number of lines differs for each one of the four end portion detecting images.

20. The image forming apparatus according to claim 1, wherein the image forming unit is configured to form the original comprising the end portion detecting image.

21. The image forming apparatus according to claim 1, wherein the image forming apparatus further comprises an analyzing unit configured to search only the determined search region for the end portion of the original, and
wherein the search region is a subcomponent of the image read by the reading unit.

22. The image position detecting original according to claim 19, wherein the number of lines for each one of the end portion detecting images indicates to which one of the four end portions the respective one of the end portion detecting images corresponds.

* * * * *